(12) United States Patent
Hwang

(10) Patent No.: US 8,155,605 B2
(45) Date of Patent: Apr. 10, 2012

(54) APPARATUS AND METHOD FOR FEEDFORWARD-TYPE PHASE NOISE ELIMINATION IN PORTABLE TERMINAL

(75) Inventor: Bo Hyun Hwang, Seoul (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 691 days.

(21) Appl. No.: 12/255,136

(22) Filed: Oct. 21, 2008

(65) Prior Publication Data

US 2010/0048150 A1 Feb. 25, 2010

(30) Foreign Application Priority Data

Aug. 25, 2008 (KR) .................. 10-2008-0082764

(51) Int. Cl.
*H03B 1/04* (2006.01)
(52) U.S. Cl. .................................................. 455/114.1
(58) Field of Classification Search .................. None
See application file for complete search history.

(56) References Cited

U.S. PATENT DOCUMENTS

| 5,077,532 A | 12/1991 | Obermann et al. |
| 7,058,368 B2* | 6/2006 | Nicholls et al. ............ 455/114.2 |
| 2003/0107434 A1* | 6/2003 | Mitzlaff ....................... 330/149 |
| 2007/0207768 A1 | 9/2007 | So et al. |

OTHER PUBLICATIONS

Office Action regarding JP102008052872 mailed Jun. 8, 2011.

* cited by examiner

*Primary Examiner* — Lincoln Donovan
*Assistant Examiner* — Khareem E Almo
(74) *Attorney, Agent, or Firm* — Lowe Hauptman Ham & Berner LLP

(57) ABSTRACT

The present invention relates to an apparatus and method for feedforward-type phase noise elimination in a portable terminal, which detect and eliminate phase-reversed phase noise by subtracting a GSM transmission signal, passed through the power amplifier of a GSM transmission device, from a GSM transmission signal, extracted from an upstream stage of the power amplifier, so that phase noise signals attributable to high-power transmission signals.

21 Claims, 14 Drawing Sheets

750MHz   900MHz

750MHz   900MHz

750MHz    900MHz

750MHz    900MHz

900MHz

750MHz   900MHz

900MHz

900MHz

750MHz   900MHz

750MHz   900MHz

900MHz

750MHz   900MHz

750MHz   900MHz

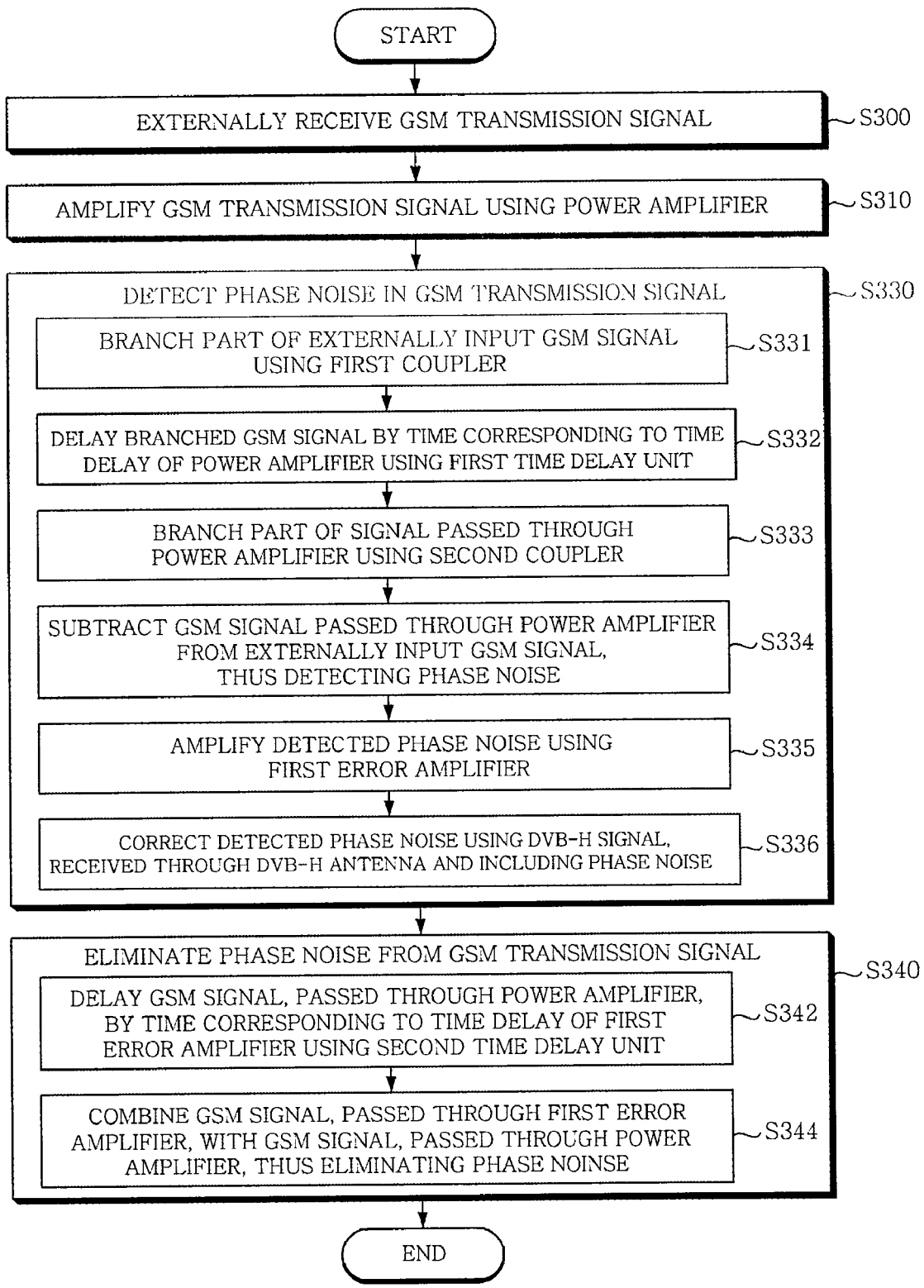

APPARATUS AND METHOD FOR FEEDFORWARD-TYPE PHASE NOISE ELIMINATION IN PORTABLE TERMINAL

CROSS REFERENCE TO RELATED APPLICATION(S)

This application claims the benefit of Korean Patent Application No. 10-2008-0082764, filed on Aug. 25, 2008, entitled "Feed Forward Type Eliminator of the Phase Noise in the Portable Terminal and Method Thereof", which is hereby incorporated by reference in its entirety into this application.

BACKGROUND OF THE INVENTION

1. Field of the Invention

The present invention relates generally to a phase noise elimination apparatus and method.

More particularly, the present invention relates to an apparatus and method for feedforward-type phase noise elimination in a portable terminal, which detect and eliminate phase-reversed phase noise by subtracting a GSM transmission signal, passed through the power amplifier of a GSM transmission device, from a GSM transmission signal, extracted from an upstream stage of the power amplifier, so that phase noise signals attributable to high-power transmission signals, such as GSM transmission signals, can be blocked at the time of receiving digital TV broadcasts, such as DVB-H broadcasts, and, as a result, the deterioration of reception sensitivity for digital TV broadcasts occurring due to the phase noise signals of high-power GSM signals can be prevented, thus improving reception performance for digital TV broadcasts, such as DVB-H broadcasts and the productivity of portable terminals.

2. Description of the Related Art

Generally, as great attention has recently been paid to digital TV broadcasting, technology for DMB in Korea and technology for DVB in European areas have been developed.

Here, the term "DMB" is an abbreviated form of "Digital Multimedia Broadcasting", which includes terrestrial DMB and satellite DMB. Further, the term "DVB" is an abbreviated form of "Digital Video Broadcasting", which includes DVB-T, in which a fixed device for home- or office-use receives broadcasts from a typical broadcasting station, and a DVB-H, in which the low power consumption, mobility and portability of mobile phones or portable video devices are taken into consideration.

Further, it is expected that, as portable terminals including mobile communication terminals, such as mobile phones or Personal Digital Assistants (PDAs), have composite characteristics, portable terminals equipped with DVB-H devices will be introduced. At this time, there is required a suitable countermeasure to cope with a phenomenon, in which, when two or more functions (Global System for Mobile communications [GSM]/General Packet Radio Service [GPRS] and DVB-H) are supported in a single terminal, reception sensitivity of each module is deteriorated due to interference between the two or more functions.

FIG. 1 is a diagram showing the construction of a conventional GSM portable terminal equipped with a DVB-H receiver.

Referring to FIG. 1, a conventional GSM portable terminal includes a GSM transmitter/receiver 11 for transmitting or receiving GSM signals of about a 900 MHz frequency band (TX: 880~915 MHz and RX: 925~960 MHz) and a DVB-H receiver 12 for receiving DVB-H broadcast signals of a frequency band ranging from about 470 MHz to 750 MHz.

The influence of phase noise of the GSM900 transmission (TX) band corresponding to about 900 MHz on a DVB-H reception (RX) band is described below with reference to FIGS. 2A and 2B.

FIGS. 2A and 2B are diagrams showing the influence of phase noise of a GSM900 TX band on a DVB-H RX band in a conventional portable terminal. FIG. 2A illustrates the influence of phase noise of a GSM900 TX band on a DVB-H RX band when a band pass filter for removing signals of the GSM900 TX band is not included in the input stage of the DVB-H receiver 12, and FIG. 2B illustrates the influence of phase noise of a GSM900 TX band on a DVB-H RX band when a band pass filter for removing signals of the GSM900 TX band is included in the input stage of the DVB-H receiver 12.

Referring to FIG. 2A, the DVB-H band is a band ranging from about 470 MHz to 750 MHz, and the GSM900 TX band is a band ranging from about 880 MHz to 915 MHz. FIG. 2A shows that the phase noise signal of a GSM TX signal flows into the DVB-H RX band, and then negatively influences a DVB-H RX signal.

Meanwhile, in a conventional portable terminal, a situation may occur in which GSM transmission/reception is performed through the GSM transmitter/receiver 11 while a digital broadcast is received through the DVB-H receiver 12. Further, a situation may also occur in which GSM transmission/reception is performed through another GSM transmitter/receiver placed close to the DVB-H receiver 12 while a digital broadcast is received through the DVB-H receiver 12.

Referring to FIG. 2B, since the GSM transmitter/receiver 11 amplifies the power of a GSM TX signal to high power of about +33 dBm through an internal power amplifier, such a high-power GSM TX signal may flow into the DVB-H receiver 12 through an antenna. In this case, the GSM TX signal acts as noise on an RX signal for a DVB-H broadcast. Therefore, in order to reduce this noise, a Band Pass Filter (BPF) may be included in the input stage of the DVB-H receiver 12. The BPF passes a DVB-H RX signal of about 470 MHz to 750 MHz therethrough and blocks a GSM TX signal of 880 MHz or more.

The BPF included in the DVB-H receiver 12 of the conventional GSM portable terminal blocks the GSM TX signal, thus removing the influence of noise attributable to intermodulation between the GSM TX signal and the DVB-H signal, which is caused in the RF circuit of the DVB-H receiver 12.

However, such a conventional GSM portable terminal is problematic in that, even if a BPF is included, a phase noise component included in a GSM TX signal of a 470 MHz to 750 MHz band corresponding to the DVB-H RX band is not blocked, but passes through the BPF without being attenuated, and influences the DVB-H RX band, thus deteriorating reception sensitivity for DVB-H broadcasts.

Such a problem of the conventional GSM portable terminal will be described in detail with reference to FIG. 3.

FIG. 3 is a graph showing the influence of phase noise-versus DVB-H reception sensitivity measured in the conventional GSM portable terminal. The graph of FIG. 3 shows the deterioration characteristics of DVB-H reception sensitivity corresponding to the phase noise level of a GSM TX signal, measured when a GSM TX signal flows into the DVB-H receiver 12 through a second antenna ANT2, and the phase noise of the GSM TX signal influences a DVB-H RX band.

Referring to FIG. 3, it can be seen that the reception sensitivity of the DVB-H receiver 12 is deteriorated by about −24 dB in such a way that, referring to reception sensitivity G11, obtained in the absence of the influence of phase noise, and G12, obtained in the presence of the influence of phase noise, reception performance is decreased from −93.5 dBm (G11) to −69.5 dBm (G12), when the phase noise level of a GSM TX signal flowing into the DVB-H receiver 12 through the second antenna ANT2 is −150 dBm/Hz.

That is, the conventional GSM portable terminal is problematic in that, since the attenuation of a GSM TX signal is not sufficiently realized by using the BPF, such a GSM TX signal flows into the DVB-H receiver 12 as a noise component, thus decreasing reception sensitivity for DVB-H broadcasts.

SUMMARY OF THE INVENTION

Accordingly, the present invention has been made keeping in mind the above problems occurring in the prior art, and the present invention is intended to provide an apparatus and method for feedforward-type phase noise elimination in a portable terminal, in which a GSM transmission device detects and eliminates phase noise, thus blocking a phase noise signal attributable to the high-power transmission signal of a portable terminal, such as a GSM terminal, when a digital TV broadcast, such as a DVB-H broadcast, is received.

Further, the present invention is intended to provide an apparatus and method for feedforward-type phase noise elimination in a portable terminal, in which phase noise detected by a GSM transmission device is corrected using phase noise detected by a DVB-H reception device, so that the GSM transmission device eliminates phase noise using the corrected phase noise, thus improving the precision of noise elimination.

In accordance with an aspect of the present invention, there is provided an apparatus for feedforward-type phase noise elimination in a portable terminal, comprising a phase noise detection unit for detecting phase noise using an input signal and an output signal of a power amplifier of a first Radio Frequency (RF) transmission unit for transmitting a first RF transmission signal using a first antenna; and a phase noise elimination unit for combining the phase noise, detected by the phase noise detection unit, with the first RF transmission signal, output from the power amplifier, thus eliminating phase noise from the first RF transmission signal, passed through the power amplifier, and outputting phase noise-eliminated first RF transmission signal.

Further, the phase noise detection unit detects and outputs phase-reversed phase noise, and the phase noise elimination unit adds the phase-reversed phase noise to the first RF transmission signal, passed through the power amplifier, thus eliminating the phase noise from the first RF transmission signal.

Further, the apparatus further comprises a phase noise correction unit for branching part of a second RF reception signal, which includes phase noise of the first RF transmission signal corresponding to a second RF signal band and is received from a second RF reception unit, from the second RF reception signal, thereby correcting the phase noise detected by the phase noise detection unit.

Further, the phase noise correction unit comprises a first coupler for branching part of the second RF reception signal, which includes phase noise of the first RF transmission signal and is output from the second RF reception unit, from the second RF reception signal; and a first subtractor for generating a corrected phase noise signal by subtracting the second RF reception signal, output from the first coupler, from the phase-reversed phase noise detected by the phase noise detection unit, and for outputting the corrected phase noise signal to the phase noise elimination unit.

Further, the phase noise correction unit further comprises a first time delay unit for delaying the second RF reception signal, branched by the first coupler, and outputting the delayed second RF reception signal to the first subtractor.

Further, the phase noise correction unit further comprises a first error amplifier for amplifying the second RF reception signal, output from the first coupler, and outputting the amplified second RF reception signal to the first subtractor.

Further, the phase noise detection unit comprises a second coupler for branching part of a first RF transmission signal, externally input to the first RF transmission unit, from the first RF transmission signal; a third coupler for branching part of the first RF transmission signal, passed through the power amplifier, from the first RF transmission signal; and a second subtractor for subtracting a first RF transmission signal, input from the third coupler, from a first RF transmission signal, input from the second coupler, thus detecting and outputting phase-reversed phase noise.

Further, the phase noise detection unit further comprises a second time delay unit for delaying the first RF transmission signal branched by the second coupler, and outputting the delayed first RF transmission signal to the second subtractor.

Further, the phase noise detection unit further comprises a second error amplifier for amplifying the phase-reversed phase noise, output from the second subtractor, and outputting the amplified phase-reversed phase noise.

Further, the phase noise detection unit comprises a fourth coupler for branching part of a first RF transmission signal, externally input to the first RF transmission unit, from the first RF transmission signal; a fifth coupler for branching part of a first RF reception signal, which is received through a second antenna and includes phase noise of the first RF transmission signal, from the first RF reception signal; and a third subtractor for subtracting a first RF reception signal, input from the fifth coupler, from a first RF transmission signal, input from the fourth coupler, thus detecting and outputting phase-reversed phase noise.

Further, the phase noise detection unit further comprises a third time delay unit for delaying the first RF transmission signal branched by the fourth coupler and outputting the delayed first RF transmission signal to the third subtractor; and a fourth time delay unit for delaying the first RF reception signal branched by the fifth coupler and outputting the delayed first RF reception signal to the third subtractor.

Further, the phase noise detection unit further comprises a third error amplifier for amplifying the phase-reversed phase noise, output from the third subtractor, and outputting amplified phase-reversed phase noise.

Further, the phase noise elimination unit comprises a combiner for combining the phase noise, detected by the phase noise detection unit, with the first RF transmission signal, passed through the power amplifier, thus eliminating phase noise from the first RF transmission signal.

Further, the phase noise elimination unit further comprises a fifth time delay unit for delaying the first RF transmission signal, passed through the power amplifier, and outputting the delayed first RF transmission signal to the combiner.

In accordance with another aspect of the present invention, there is provided a method for feedforward-type phase noise elimination in a portable terminal, comprising (a) a phase noise detection unit detecting phase noise using an input signal and an output signal of a power amplifier of a first Radio Frequency (RF) transmission unit for transmitting a first RF transmission signal using a first antenna; and (b) a phase noise elimination unit combining the phase noise, detected by the phase noise detection unit, with the first RF transmission signal, output from the power amplifier, thus eliminating phase noise from the first RF transmission signal, passed through the power amplifier, and outputting phase noise-eliminated first RF transmission signal.

Further, the phase noise detected in (a) is phase-reversed phase noise; and the elimination of the phase noise in (b) is performed such that the phase noise elimination unit adds the phase-reversed phase noise to the first RF transmission signal passed through the power amplifier, thus eliminating the phase noise from the first RF transmission signal.

Further, the method further comprises (c) a phase noise correction unit branching part of a second RF reception signal, which is output from a second RF reception unit and includes phase noise of the first RF transmission signal corresponding to a second RF signal band, from the second RF reception signal, thus correcting and outputting the phase noise detected by the phase noise detection unit.

Further, the (c) comprises a first coupler, provided in the phase noise correction unit, branching part of the second RF reception signal, which includes phase noise of the first RF transmission signal corresponding to the second RF signal band and is output from the second RF reception unit; and a first subtractor, provided in the phase noise correction unit, generating a corrected phase noise signal by subtracting the second RF reception signal, output from the first coupler, from the phase-reversed phase noise detected by the phase noise detection unit, and outputting the corrected phase noise signal to the phase noise elimination unit.

Further, the (c) further comprises, after the first coupler branches part of the second RF reception signal, a first time delay unit, provided in the phase noise correction unit, delaying the second RF reception signal branched by the first coupler and outputting the delayed second RF reception signal to the first subtractor.

Further, the (c) further comprises, after the first coupler branches and outputs part of the second RF reception signal, a first error amplifier, provided in the phase noise correction unit, amplifying the signal output from the first coupler and outputting the amplified signal to the first subtractor.

Further, the (a) comprises a second coupler, provided in the phase noise detection unit, branching part of the first RF transmission signal, externally input to the first RF transmission unit, from the first RF transmission signal; a third coupler, provided in the phase noise detection unit, branching part of the second RF transmission signal passed through the power amplifier from the second RF transmission signal; and a second subtractor, provided in the phase noise detection unit, subtracting the second RF transmission signal, input from the third coupler, from the first RF transmission signal, input from the second coupler, thus detecting and outputting phase-reversed phase noise.

Further, the (a) further comprises, after the second coupler branches part of the first RF transmission signal, a second time delay unit of the phase noise detection unit delaying the first RF transmission signal, branched by the second coupler, and outputting the delayed first RF transmission signal to the second subtractor.

Further, the (a) further comprises, after the second subtractor detects and outputs the phase-reversed phase noise, a second error amplifier, provided in the phase noise detection unit, amplifying the phase-reversed phase noise, output from the second subtractor, and outputting the amplified phase-reversed phase noise.

Further, the (a) comprises a fourth coupler, provided in the phase noise detection unit, branching part of a first RF transmission signal, externally input to the first RF transmission unit, from the first RF transmission signal; a fifth coupler, provided in the phase noise detection unit, branching part of a first RF reception signal, which is received through a second antenna and includes phase noise of the first RF transmission signal, from the first RF reception signal; and a third subtractor, provided in the phase noise detection unit, subtracting a first RF reception signal, input from the fifth coupler, from a first RF transmission signal, input from the fourth coupler, thus detecting and outputting phase-reversed phase noise.

Further, the (a) further comprises, after the fourth coupler branches part of the first RF transmission signal, a third time delay unit, provided in the phase noise detection unit, delaying the first RF transmission signal branched by the fourth coupler, and outputting the delayed first RF transmission signal to the third subtractor; and the (a) further comprises, after the fifth coupler branches part of the first RF reception signal, a fourth time delay unit, provided in the phase noise detection unit, delaying the first RF reception signal branched by the fifth coupler and outputting the delayed first RF reception signal to the third subtractor.

Further, the (a) further comprises, after the third subtractor detects and outputs the phase noise, a third error amplifier, provided in the phase noise detection unit, amplifying the phase-reversed phase noise output from the third subtractor, and outputting the amplified phase-reversed phase noise.

Further, the (b) comprises a fifth time delay unit, provided in the phase noise elimination unit, delaying the first RF transmission signal, passed through the power amplifier, and outputting the delayed RF transmission signal; and a combiner, provided in the phase noise elimination unit, combining the phase noise, detected by the phase noise detection unit, with the first RF transmission signal, passed through the fifth time delay unit, thus eliminating the phase noise from the first RF transmission signal.

Meanwhile, in 'Summary of the Invention' and 'Claims' of the present invention, identifiers, such as first, second, and third, are used to distinguish a plurality of couplers, subtractors, error amplifiers, and time delay units from each other. Such identifiers are arbitrarily used only to identify a plurality of components having the same functionality, and are not necessarily identical to the identifiers used in the detailed description of the present invention. Therefore, components denoted by respective identifiers should be ascertained by reference to the detailed description and the drawings of the invention.

Further, in 'Summary of the Invention' and 'Claims' of the present invention, the term 'first RF' means a frequency for mobile communication used in mobile communication terminals. In the detailed description of the invention, a GSM portable terminal is described as an example of the mobile communication terminal, but the mobile communication terminal is not limited to this example.

Further, in 'Summary of the Invention' and 'Claims' of the present invention, the term 'second RF' means the frequency of a signal for digital broadcasts. In the detailed description of the invention, a DVB-H signal is described as an example of a second RF signal, but the second RF signal is not limited to this example.

BRIEF DESCRIPTION OF THE DRAWINGS

The above and other objects, features and advantages of the present invention will be more clearly understood from the following detailed description taken in conjunction with the accompanying drawings, in which:

FIG. 12 is a flowchart showing the operations of a portable terminal equipped with an apparatus for feedforward-type phase noise elimination according to a further embodiment of the present invention.

DESCRIPTION OF THE PREFERRED EMBODIMENTS

Hereinafter, an apparatus for feedforward-type phase noise elimination in a portable terminal according to an embodiment of the present invention will be described in detail with reference to FIG. 4.

Figure 1:
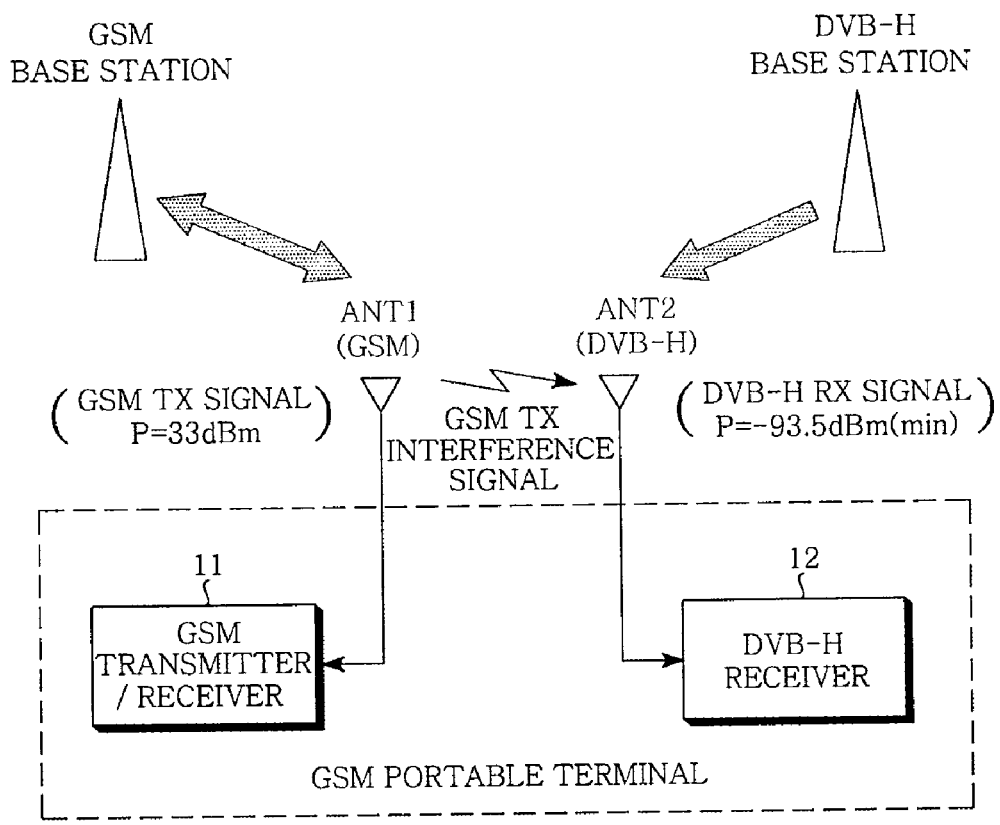
FIG. 1 is a diagram showing the construction of a conventional GSM portable terminal equipped with a DVB-H receiver.
Figure 2A:
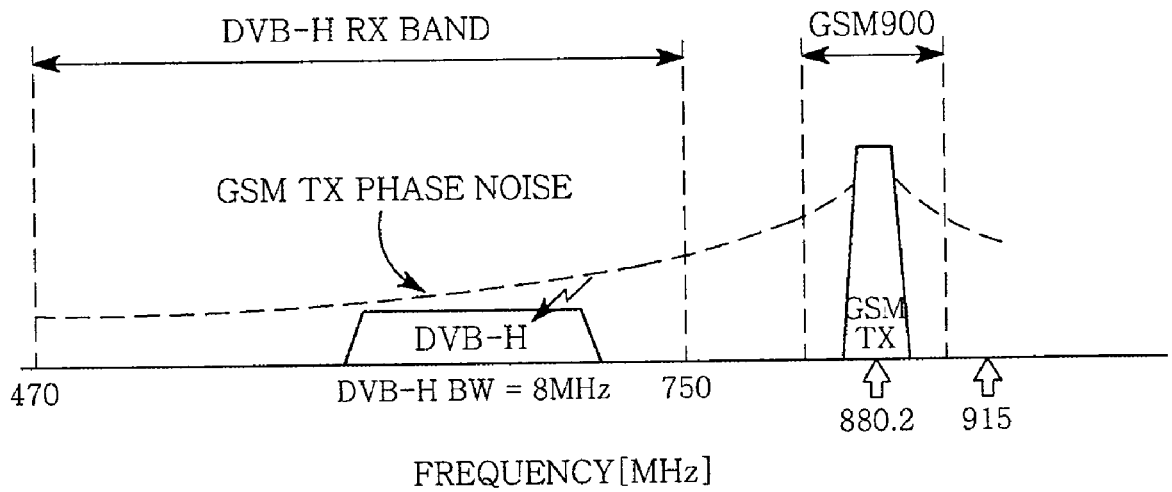
FIGS. 2A and 2B are diagrams showing the influence of phase noise of a GSM900 transmission band on a DVB-H reception band in the conventional portable terminal.
Figure 2B:
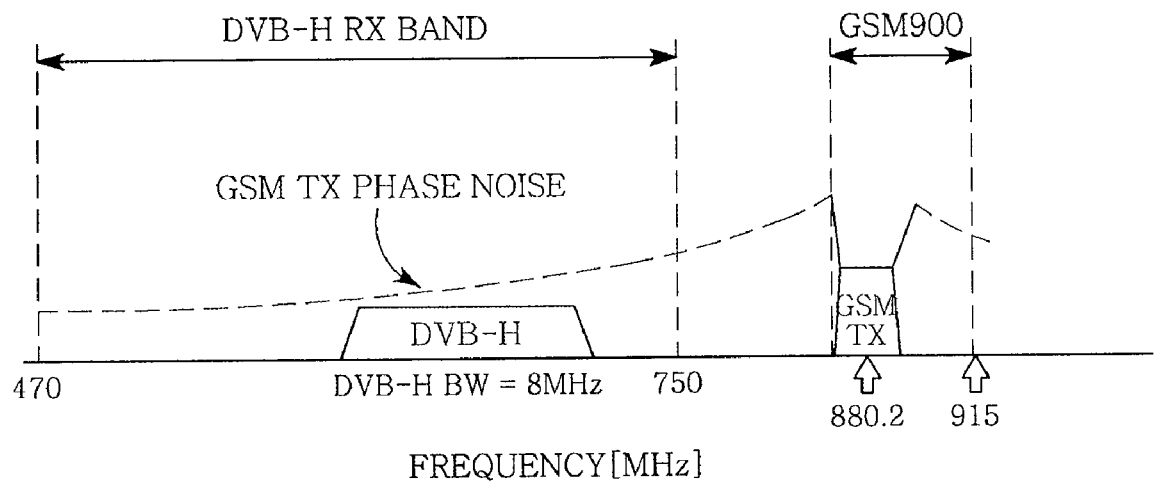
Figure 3:
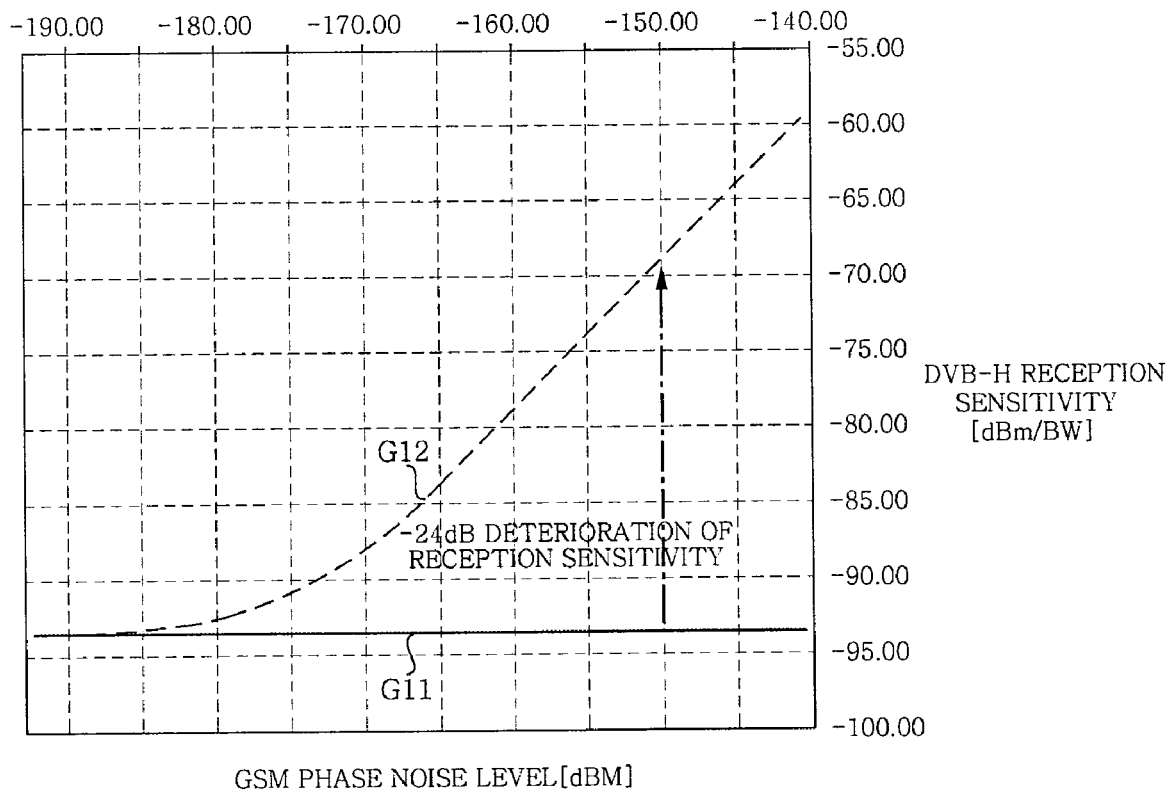
FIG. 3 is a graph showing the influence of phase noise-versus DVB-H reception sensitivity measured in the conventional GSM portable terminal.
Figure 4:
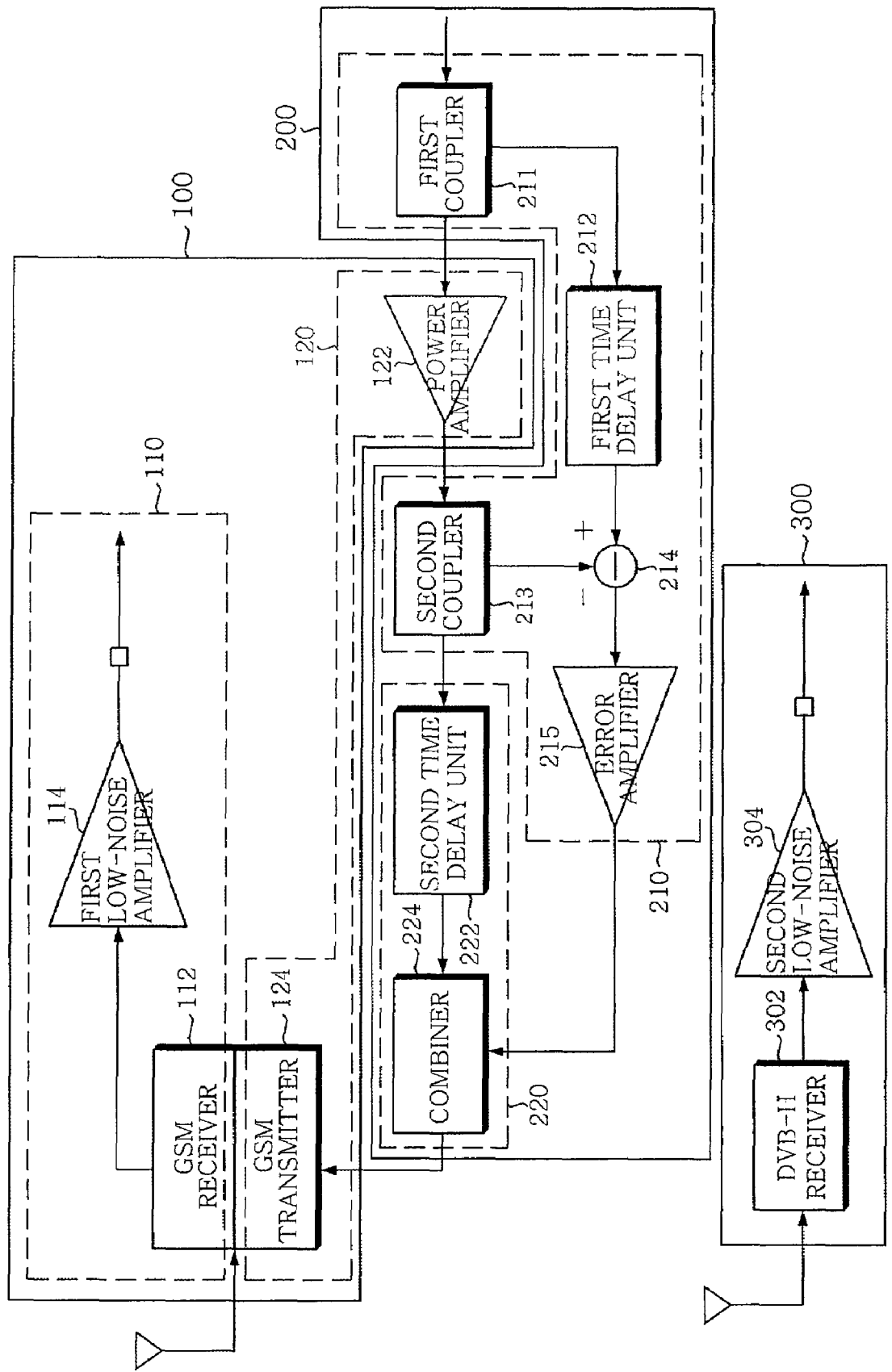
FIG. 4 is a diagram showing the construction of a portable terminal equipped with an apparatus for feedforward-type phase noise elimination according to an embodiment of the present invention.

FIG. 4 is a diagram showing the construction of a portable terminal equipped with an apparatus for feedforward-type phase noise elimination according to an embodiment of the present invention.

Referring to FIG. 4, the portable terminal equipped with an apparatus for feedforward-type phase noise elimination according to an embodiment of the present invention includes a GSM signal processing block 100, a phase noise elimination apparatus 200, and the DVB-H reception unit 300 of a DVB-H signal processing block.

Here, the GSM signal processing block 100 is configured to process a GSM signal, and includes a GSM reception unit 110 for receiving a GSM signal through a GSM antenna and a GSM transmission unit 120 for transmitting a GSM signal through the GSM antenna.

The GSM reception unit 110 is configured to detect and process a GSM signal from the signal received through the GSM antenna, and includes a GSM receiver 112 for extracting a GSM signal by performing filtering on the signal, received through the GSM antenna, through a band pass filter provided therein, and for outputting the extracted GSM signal, and a first low-noise amplifier 114 for amplifying the GSM signal extracted by the GSM receiver 112 and outputting the amplified GSM signal.

Further, the GSM transmission unit 120 is configured to amplify an externally input GSM signal to high power and to transmit the amplified GSM signal through the GSM antenna. The GSM transmission unit 120 includes a power amplifier 122 for amplifying the externally input GSM signal to high power, as shown in FIG. 5B, and outputting the amplified GSM signal so that the externally input GSM signal, in which phase noise is not produced, can be transmitted through the GSM antenna, as shown in FIG. 5A, and a GSM transmitter 124 for outputting the GSM signal amplified by the power amplifier 122 to the antenna.

Figure 5A:
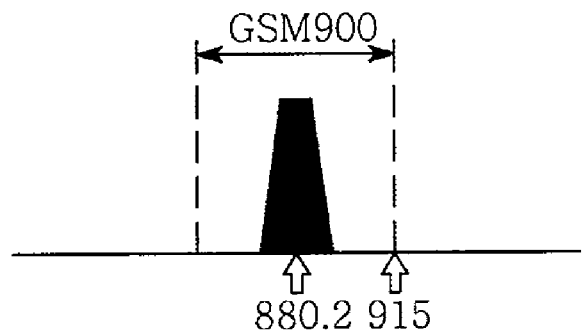
FIGS. 5A to 5G are diagrams showing the influence of phase noise of a GSM900 transmission band on a DVB-H reception band in the portable terminal according to the present invention.
Figure 5B:
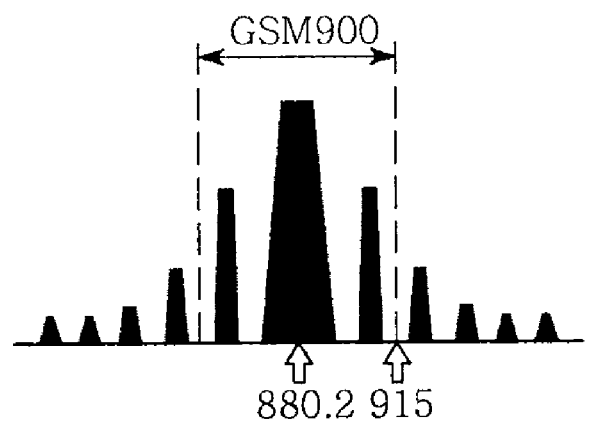

When the GSM signal is amplified to high power while passing through the power amplifier 122 in the GSM transmission unit 120, phase noise of FIG. 5B is produced in the GSM transmission signal, and such phase noise must be eliminated.

Meanwhile, the phase noise elimination apparatus 200 according to the present invention is configured to detect and eliminate phase noise produced in the GSM transmission signal output through the power amplifier 122, and includes a phase noise detection unit 210 and a phase noise elimination unit 220.

Figure 5C:
Figure 5D:

The phase noise detection unit 210 includes a first coupler 211 for branching part of the externally input GSM signal of FIG. 5A, in which phase noise is not produced, from the externally input GSM signal at an input terminal, a first time delay unit 212 for delaying the GSM signal branched by the first coupler 211, a second coupler 213 for branching part of the GSM signal of FIG. 5B, which has passed through the power amplifier 122 and in which phase noise is produced, from the GSM signal, a subtractor 214 for subtracting the GSM signal, which is branched by the second coupler 213 and in which the phase noise is produced, from the GSM signal, which is delayed by the first time delay unit 212 and in which phase noise is not produced, thus detecting the phase-reversed phase noise of FIG. 5C, and an error amplifier 215 for amplifying the phase noise detected by the subtractor 214, as shown in FIG. 5D.

Here, the reason for requiring the error amplifier 215 is that phase noise detected by the subtractor 214 has a power level lower than that of the phase noise included in the GSM signal, passed through the power amplifier 122. In this way, only when the phase noise output from the subtractor 214 is amplified using the error amplifier 215, and the amplified phase noise is combined with the GSM signal passed through the power amplifier 122, can the phase noise be completely eliminated.

Figure 5E:
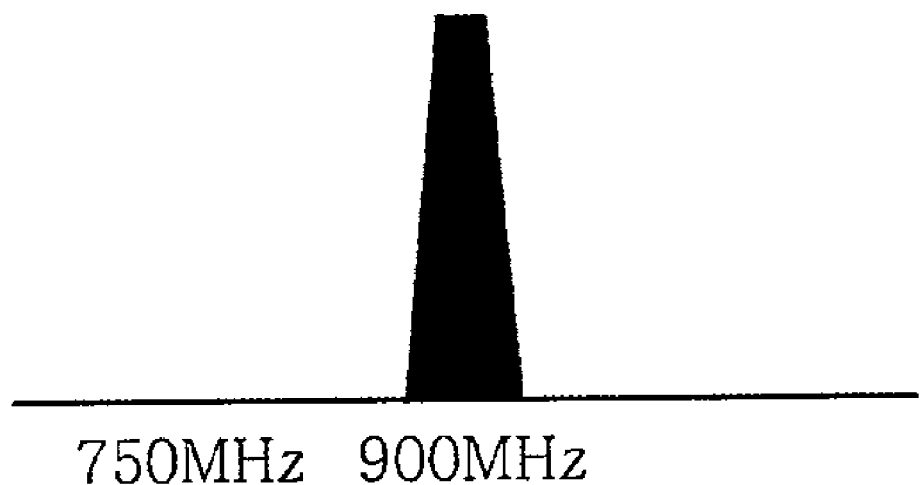

Further, the phase noise elimination unit 220 is configured to eliminate phase noise by combining the phase-reversed phase noise, detected by the phase noise detection unit 210, with the GSM signal, including the phase noise, and includes a second time delay unit 222 for delaying the GSM signal passed through the power amplifier 122 (or the second coupler 213), and a combiner 224 for eliminating phase noise from the GSM signal by combining the phase-reversed phase noise with the GSM signal delayed by the second time delay unit 222. As shown in FIG. 5E, a phase noise-eliminated GSM transmission signal is transmitted.

Meanwhile, the DVB-H reception unit 300 of the DVB-H signal processing block includes a DVB-H receiver 302 for performing filtering on the signal, received through the DVB-H antenna, using a band pass filter, thus extracting a DVB-H signal, and a second low-noise amplifier 304 for amplifying the signal received from the DVB-H receiver 302 and outputting the amplified signal.

Figure 5F:
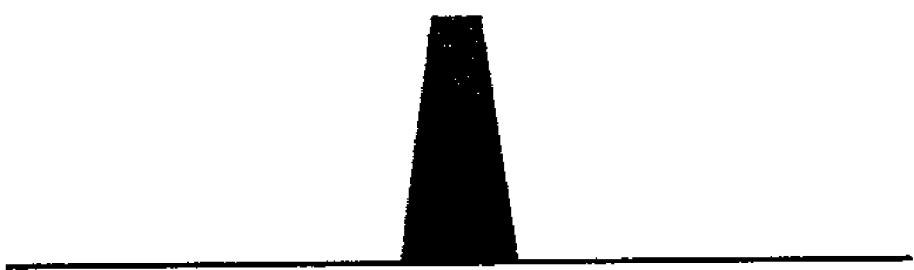
Figure 5G:

The DVB-H reception unit 300 of the DVB-H signal processing block receives the phase noise-eliminated GSM transmission signal from the GSM signal processing block 100, with the power level of the phase noise-eliminated GSM transmission signal decreased (refer to FIG. 5F), performs filtering on the received signal using a band pass filter, and obtains a DVB-H signal, in which the phase noise of the GSM transmission signal is not detected, as shown in FIG. 5G.

Figure 6:
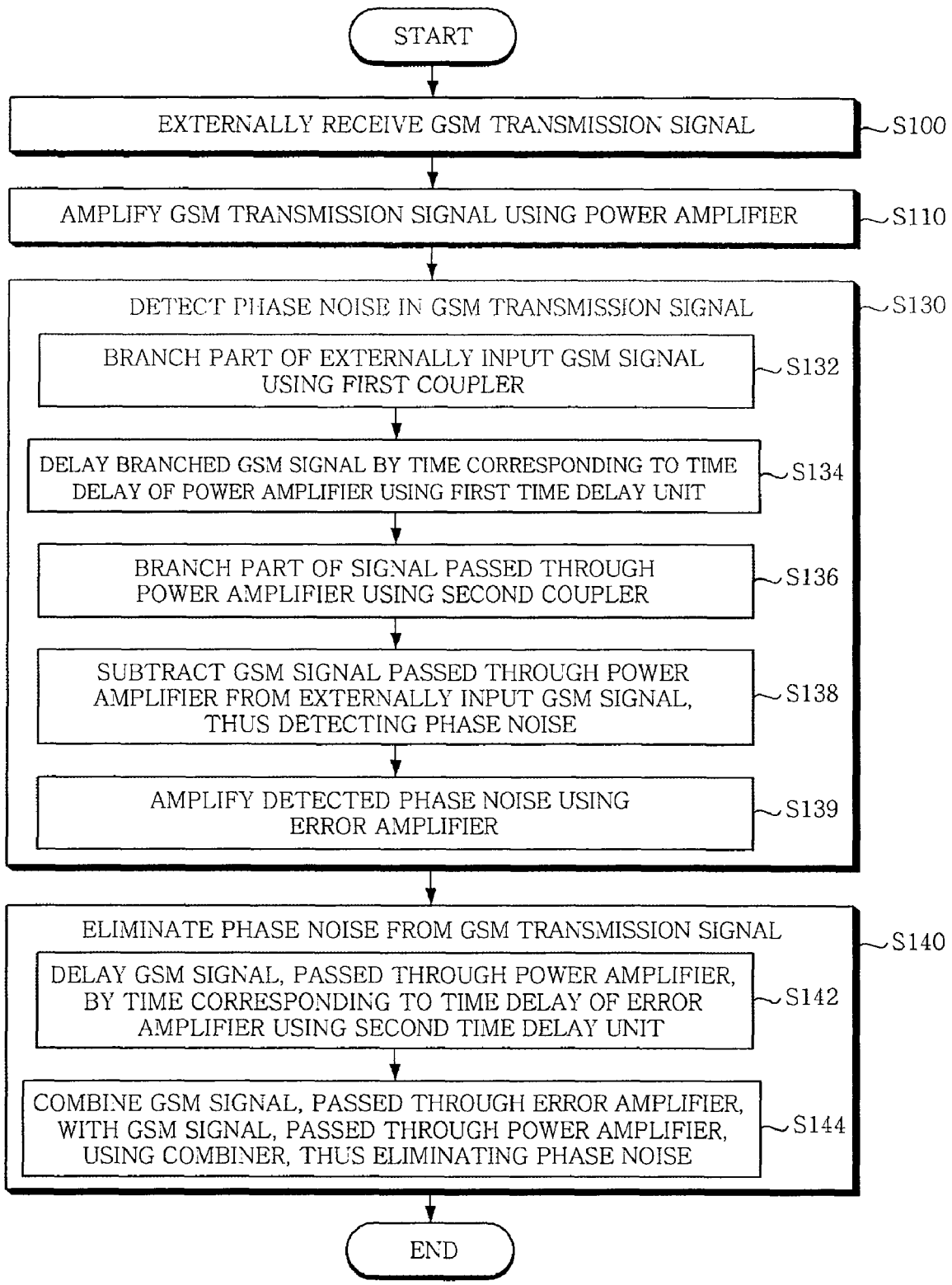
FIG. 6 is a flowchart showing the operations of a portable terminal equipped with an apparatus for feedforward-type phase noise elimination according to an embodiment of the present invention.

FIG. 6 is a flowchart showing the operations of an apparatus for feedforward-type phase noise elimination in a portable terminal according to an embodiment of the present invention.

Referring to FIG. 6, the input terminal of the GSM transmission unit 120 receives an externally input GSM signal, in which phase noise is not produced, as shown in FIG. 5A, at step S100.

Further, the power amplifier 122 of the GSM transmission unit 120 amplifies the externally input GSM signal to high power and outputs the amplified signal so that the GSM signal can be transmitted through the GSM antenna at step S110.

Thereafter, in order to eliminate phase noise, the phase noise elimination apparatus 200 detects phase noise at step S130, and combines the detected phase noise with the GSM transmission signal, with the phase of the phase noise reversed, thus eliminating the phase noise at step S140.

For this operation, the first coupler 211 branches part of the externally input GSM signal from the externally input GSM signal, and outputs the branched signal at step S132. The first time delay unit 212 generates a time delay, corresponding to the time delay of the power amplifier 122, in the GSM signal at step S134.

Further, part of the GSM signal, in which phase noise is produced and which is output from the power amplifier 122, is branched from the GSM signal using the second coupler 213 at step S136. The part of the GSM signal, in which the phase noise is produced, is subtracted from the externally input GSM signal using the subtractor 214, and thus the phase-reversed phase noise is detected and output, as shown in FIG. 5C, at step S138.

Thereafter, the phase-reversed phase noise is amplified by the error amplifier 215 to a level corresponding to that of the GSM signal, passed through the power amplifier 122, and the amplified phase noise is then output at step S139.

Meanwhile, the second time delay unit 222 of the phase noise elimination unit 220 delays and outputs the power-amplified GSM signal output from the power amplifier 122 so that the time delay generated in the error amplifier 215 is canceled at step S142.

Then, the combiner 224 combines the phase-reversed phase noise, passed through the error amplifier 215, with the delayed GSM signal, thus eliminating the phase noise from the GSM signal at step S144.

In this way, the phase noise-eliminated GSM signal is transmitted to outside the GSM signal processing block through the GSM transmitter 124 and the GSM antenna. Since the phase noise-eliminated signal is transmitted in this way, the influence of phase noise is nullified even if the DVB-H receiver 302 receives a GSM signal.

Figure 7:
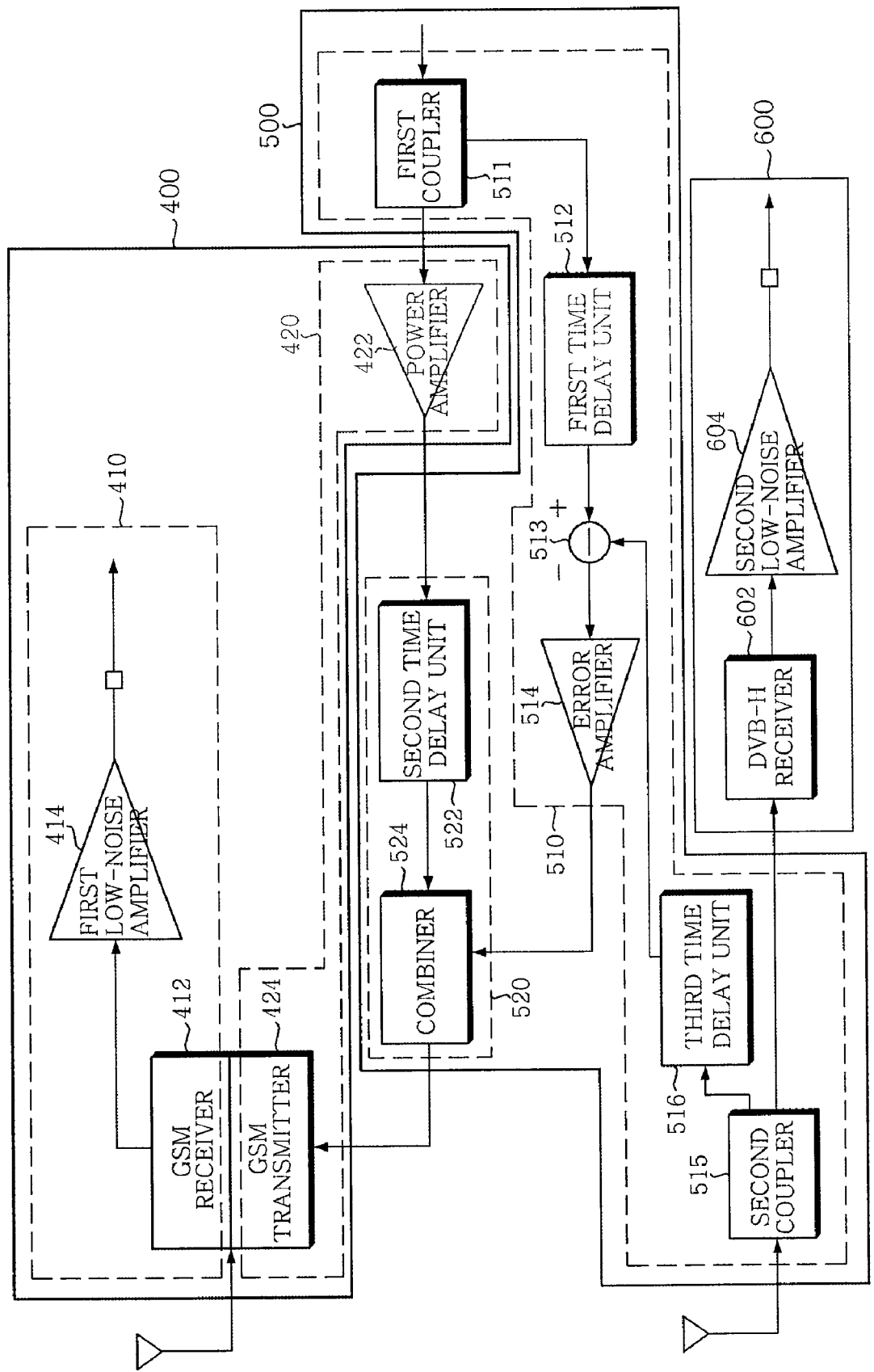
FIG. 7 is a diagram showing the construction of a portable terminal equipped with an apparatus for feedforward-type phase noise elimination according to another embodiment of the present invention.

FIG. 7 is a diagram showing the construction of a portable terminal equipped with an apparatus for feedforward-type phase noise elimination according to another embodiment of the present invention.

Referring to FIG. 7, the portable terminal equipped with an apparatus for feedforward-type phase noise elimination according to another embodiment of the present invention includes a GSM signal processing block 400, a phase noise elimination apparatus 500, and the DVB-H reception unit 600 of a DVB-H signal processing block.

Here, the GSM signal processing block 400 is configured to process a GSM signal, and includes a GSM reception unit 410 for receiving a GSM signal through a GSM antenna and a GSM transmission unit 420 for transmitting a GSM signal through the GSM antenna.

The GSM reception unit 410 is configured to detect and process a GSM signal received through the GSM antenna. The GSM reception unit 410 includes a GSM receiver 412 for extracting a GSM signal by performing filtering on the signal received through the GSM antenna using a band pass filter provided therein, and for outputting the extracted GSM signal, and a first low-noise amplifier 414 for amplifying the GSM signal extracted by the GSM receiver 412 and outputting the amplified GSM signal.

Further, the GSM transmission unit 420 is configured to amplify an externally input (GSM signal to high power and to transmit the amplified GSM signal through the GSM antenna. The GSM transmission unit 420 includes a power amplifier 422 for amplifying the externally input GSM signal to high power and outputting the amplified GSM signal so that the externally input GSM signal, in which phase noise is not produced, can be transmitted through the GSM antenna, as shown in FIG. 8A, and a GSM transmitter 424 for outputting the GSM signal amplified by the power amplifier 422 to the antenna.

Figure 8A:
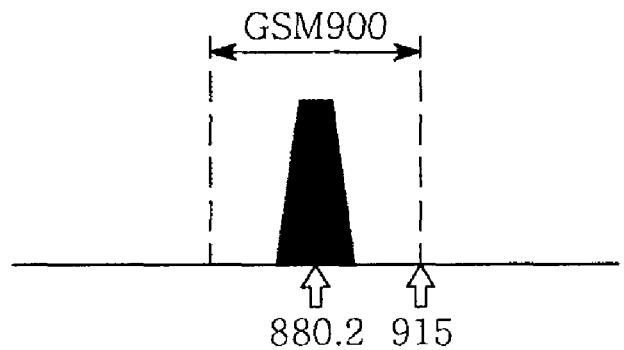
FIGS. 8A to 8F are diagrams showing the influence of phase noise of a GSM900 transmission band on a DVB-H reception band in the portable terminal according to another embodiment of the present invention.
Figure 8B:
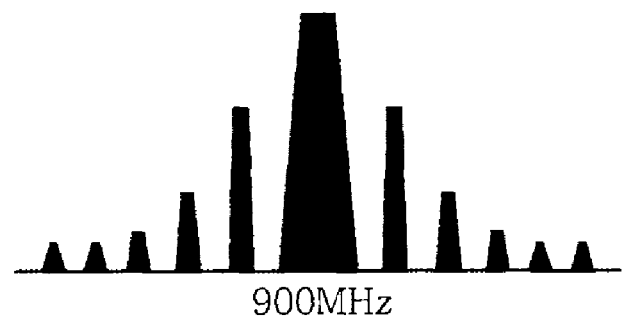

When the GSM signal passes through the power amplifier 422 in such a GSM transmission unit 420, phase noise of FIG. 8B is produced in a GSM transmission signal, and such phase noise must be eliminated.

Meanwhile, the phase noise elimination apparatus 500 according to the present invention is configured to detect and eliminate phase noise produced in the GSM transmission signal passed through the power amplifier 422, and includes a phase noise detection unit 510 and a phase noise elimination unit 520.

Figure 8C:
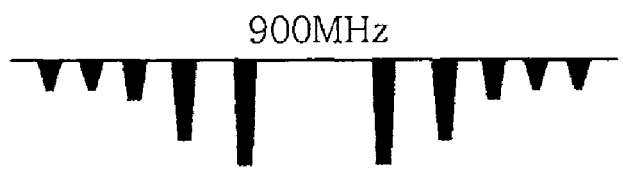
Figure 8D:
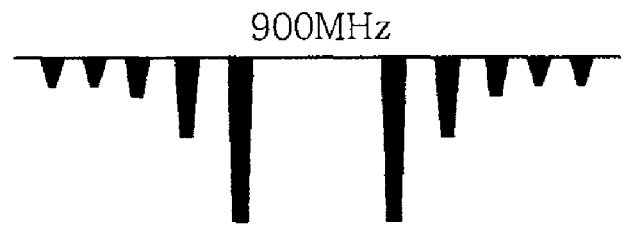

The phase noise detection unit 510 includes a first coupler 511 for branching part of the externally input GSM signal of FIG. 8A, in which phase noise is not produced, from the externally input GSM signal at an input terminal, a first time delay unit 512 for delaying the GSM signal branched by the first coupler 511, a second coupler 515 for branching part of a GSM signal, which includes the phase noise component of a GSM transmission signal and which is received through a DVB-H antenna, from the GSM signal, a third time delay unit 516 for delaying the GSM signal, in which the phase noise is included and which is branched by the second coupler 515, a subtractor 513 for subtracting the GSM signal, which is branched by the second coupler 515 and in which the phase noise is produced, from the GSM signal, which is delayed by the first time delay unit 512 and in which phase noise is not produced, thus detecting phase-reversed phase noise, as shown in FIG. 8C, and an error amplifier 514 for amplifying the phase noise detected by the subtractor 513, as shown in FIG. 8D.

Here, the reason for requiring the error amplifier 514 is that phase noise detected by the subtractor 513 has a power level lower than that of the phase noise included in the GSM signal, passed through the power amplifier 422. In this way, only when the phase noise output from the subtractor 513 is amplified using the error amplifier 514, and the amplified phase noise is combined with the GSM signal passed through the power amplifier 422, can the phase noise be completely eliminated.

Further, the phase noise elimination unit 520 is configured to eliminate phase noise by combining the phase-reversed phase noise, detected by the phase noise detection unit 510, with the GSM signal, including the phase noise. The phase noise elimination unit 520 includes a second time delay unit 522 for delaying the GSM signal, passed through the power amplifier 422, and a combiner 524 for eliminating phase noise from the GSM signal by combining the phase-reversed phase noise with the GSM signal delayed by the second time delay unit 522.

Meanwhile, the DVB-H reception unit 600 of the DVB-H signal processing block includes a DVB-H receiver 602 for performing filtering on the signal, received through the DVB-H antenna, using a band pass filter, thus extracting a DVB-H signal, and a second low-noise amplifier 604 for amplifying the signal received from the DVB-H receiver 602 and outputting the amplified signal.

Figure 8E:
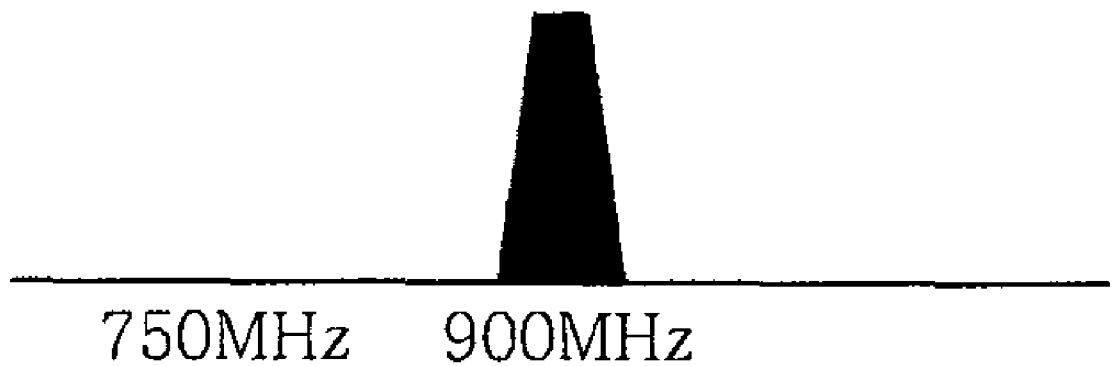
Figure 8F:

The DVB-H reception unit 600 of the DVB-H signal processing block receives the phase noise-eliminated GSM transmission signal from the GSM signal processing block 400, with the power level of the phase noise-eliminated GSM transmission signal decreased (refer to FIG. 8E), performs filtering on the received signal using a band pass filter, and obtains a DVB-H signal, in which the phase noise of the GSM transmission signal is not detected, as shown in FIG. 8F.

Figure 9:
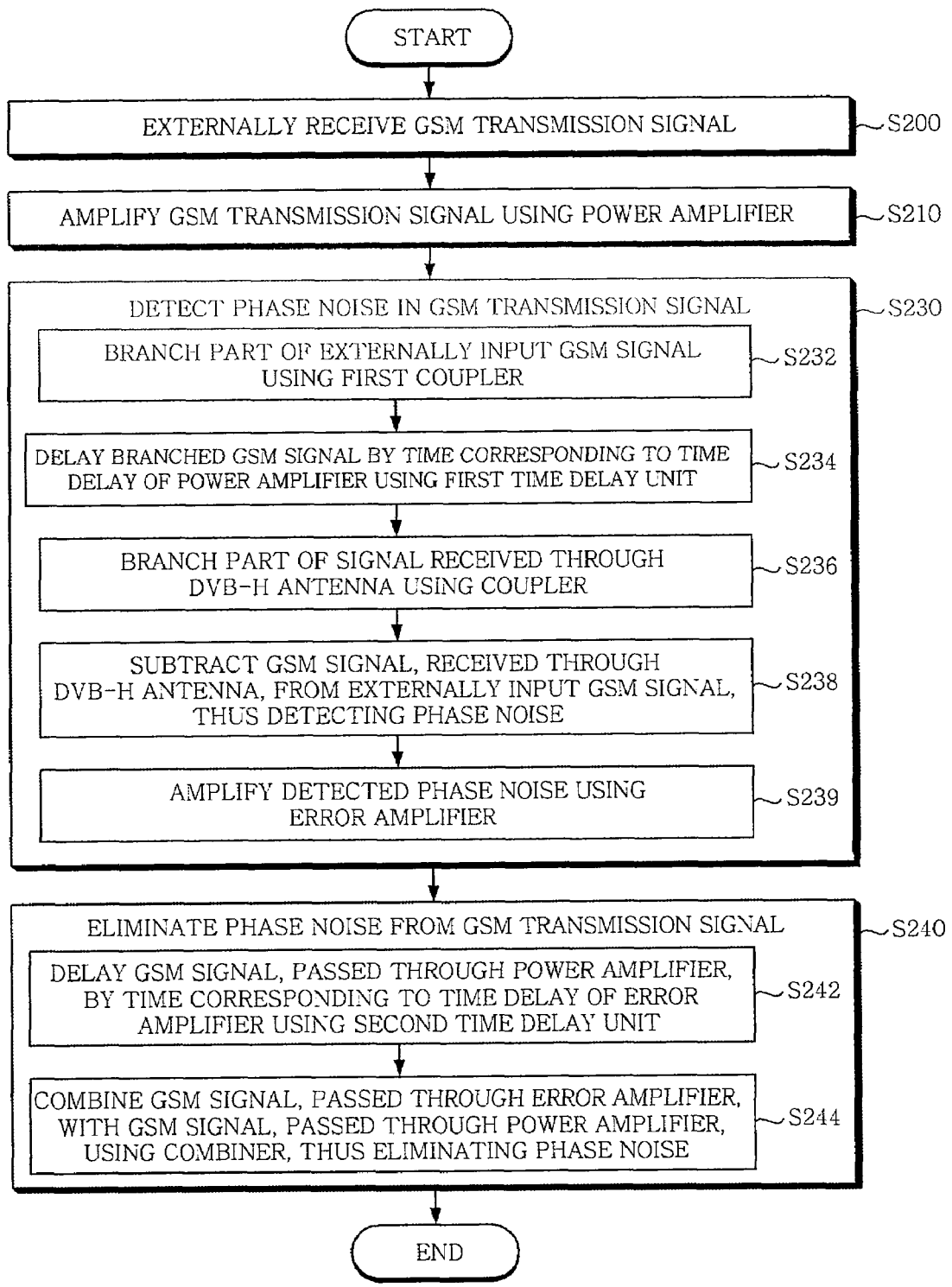
FIG. 9 is a flowchart showing the operations of a portable terminal equipped with an apparatus for feedforward-type phase noise elimination according to another embodiment of the present invention.

FIG. 9 is a flowchart showing the operations of an apparatus for feedforward-type phase noise elimination according to another embodiment of the present invention.

Referring to FIG. 9, the input terminal of the GSM transmission unit 420 receives an externally input GSM signal, in which phase noise is not produced, as shown in FIG. 8A, at step S200.

Further, the power amplifier 422 of the GSM transmission unit 420 amplifies the externally input GSM signal to high power and outputs the amplified signal so that the GSM signal can be transmitted through the GSM antenna at step S210.

In order to eliminate phase noise, the phase noise elimination apparatus 500 detects phase noise at step S230, and combines the detected phase noise with the GSM transmission signal, with the phase of the phase noise reversed, thus eliminating the phase noise at step S240.

For this operation, the first coupler 511 branches part of the externally input GSM signal from the externally input GSM signal, and outputs the branched signal at step S232. The first time delay unit 512 generates a time delay, corresponding to the time delay of the power amplifier 422, in the GSM signal at step S234.

Further, the GSM signal, including phase noise, is received using the second coupler 515 through the DVB-H antenna, and is then subtracted from the externally input GSM signal using the subtractor 513, and thus the phase-reversed phase noise of FIG. 8C is detected and output at step S238.

Thereafter, the phase-reversed phase noise is amplified by the error amplifier 514 to a level corresponding to that of the GSM signal, passed through the power amplifier 422, and the amplified phase noise is then output at step S239.

Meanwhile, the second time delay unit 522 of the phase noise elimination unit 520 delays and outputs the power-amplified GSM signal output from the power amplifier 422 so that the time delay generated in the error amplifier 514 is canceled at step S242.

Then, the combiner 524 combines the phase-reversed phase noise, passed through the error amplifier 514, with the delayed GSM signal, thus eliminating the phase noise from the GSM signal at step S244.

In this way, the phase noise-eliminated GSM signal is transmitted to outside the GSM signal processing block through the GSM transmitter 424 and the GSM antenna. Since the phase noise-eliminated signal is transmitted in this way, the influence of phase noise is nullified even if the DVB-H receiver 602 receives a GSM signal.

Figure 10:
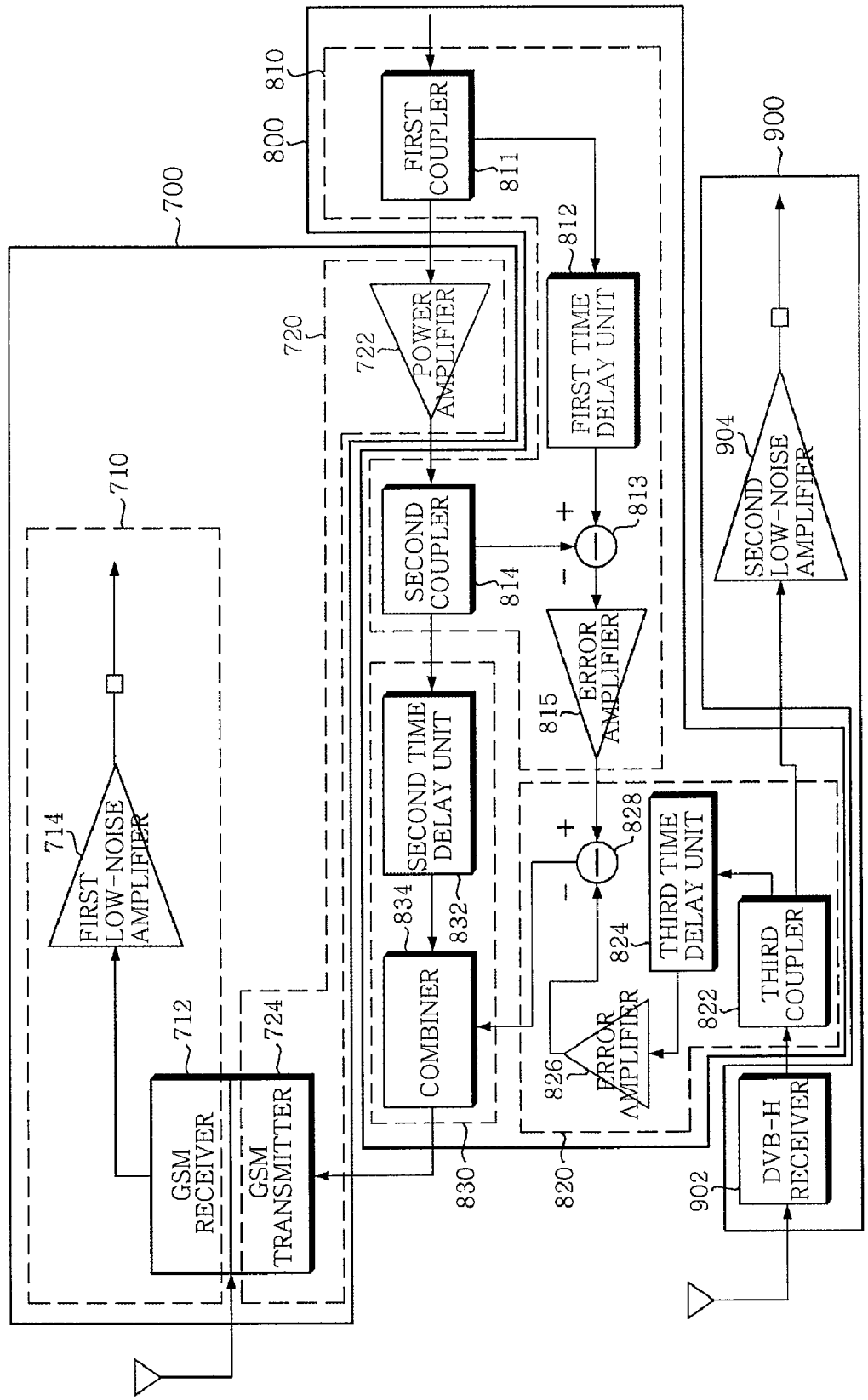
FIG. 10 is a diagram showing the construction of a portable terminal equipped with an apparatus for feedforward-type phase noise elimination according to a further embodiment of the present invention.

FIG. 10 is a diagram showing the construction of a portable terminal equipped with an apparatus for feedforward-type phase noise elimination according to a further embodiment of the present invention.

Referring to FIG. 10, the portable terminal equipped with an apparatus for feedforward-type phase noise elimination according to a further embodiment of the present invention includes a GSM signal processing block 700, a phase noise elimination apparatus 800, and the DVB-H reception unit 900 of a DVB-H signal processing block.

Here, the GSM signal processing block 700 is configured to process a GSM signal, and includes a GSM reception unit 710 for receiving a GSM signal through a GSM antenna and a GSM transmission unit 720 for transmitting a GSM signal through the GSM antenna.

The GSM reception unit 710 is configured to detect and process a GSM signal from a signal received through the GSM antenna, and includes a GSM receiver 712 for extracting a GSM signal by performing filtering on the signal, received through the GSM antenna, through a band pass filter provided therein, and outputting the extracted GSM signal, and a first low-noise amplifier 714 for amplifying the GSM signal extracted by the GSM receiver 712 and outputting the amplified GSM signal.

Further, the GSM transmission unit 720 is configured to amplify an externally input GSM signal to high power and to transmit the amplified GSM signal through the GSM antenna. The GSM transmission unit 720 includes a power amplifier 722 for amplifying the externally input GSM signal to high power and outputting the amplified GSM signal so that the externally input GSM signal, in which phase noise is not produced, can be transmitted through the GSM antenna, as shown in FIG. 11A, and a GSM transmitter 724 for outputting the GSM signal amplified by the power amplifier 722 to the antenna.

Figure 11A:
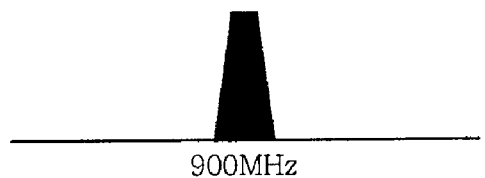
FIGS. 11A to 11I are diagrams showing the influence of phase noise of a GSM900 transmission band on a DVB-H reception band in the portable terminal according to a further embodiment of the present invention.
Figure 11B:
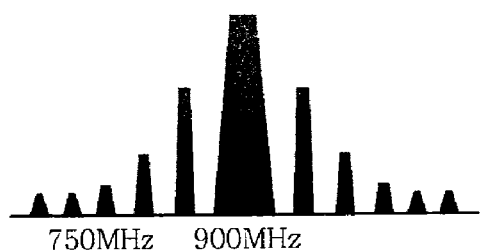

When the GSM signal passes through the power amplifier 722 in the GSM transmission unit 720, 900 MHz band-phase noise of FIG. 11B is produced in a GSM transmission signal, and such phase noise must be eliminated.

Meanwhile, the phase noise elimination apparatus 800 according to the present invention is configured to detect and eliminate phase noise produced in the GSM transmission signal passed through the power amplifier 722, and includes a phase noise detection unit 810, a phase noise correction unit 820, and a phase noise elimination unit 830.

Figure 11C:
Figure 11D:
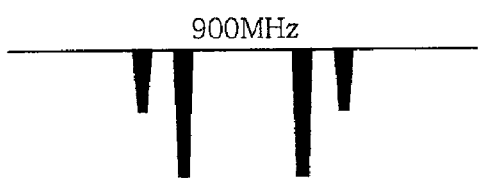

The phase noise detection unit 810 includes a first coupler 811 for branching part of the externally input GSM signal of FIG. 11A, in which phase noise is not produced, from the externally input GSM signal at an input terminal, a first time delay unit 812 for delaying the GSM signal branched by the first coupler 811, a second coupler 814 for branching part of the GSM signal of FIG. 11B, which has passed through the power amplifier 722 and in which phase noise is produced, from the GSM signal, a first subtractor 813 for subtracting the GSM signal, which is branched by the second coupler 814 and in which the phase noise is produced, from the GSM signal, which is delayed by the first time delay unit 812 and in which phase noise is not produced, thus detecting the phase-reversed phase noise of FIG. 11C, and a first error amplifier 815 for amplifying the phase noise detected by the first subtractor 813, as shown in FIG. 11D.

Here, the reason for requiring the first error amplifier 815 is that phase noise detected by the first subtractor 813 has a power level lower than that of the phase noise included in the GSM signal, passed through the power amplifier 722. In this way, only when the phase noise output from the first subtractor 813 is amplified using the first error amplifier 815, and the amplified phase noise is combined with the GSM signal passed through the power amplifier 722, can the phase noise be completely eliminated.

Figure 11E:
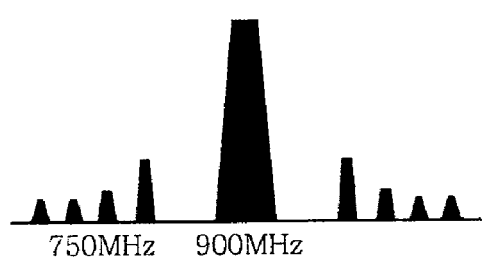
Figure 11F:
Figure 11G:
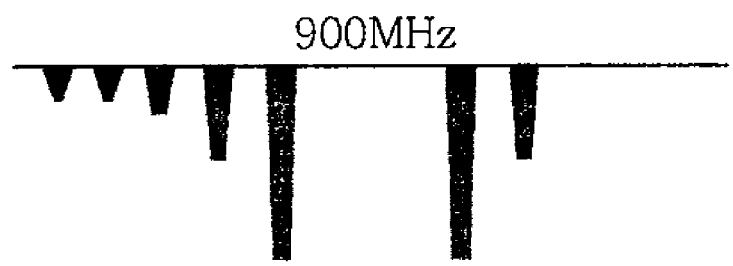

Further, the phase noise correction unit 820 includes a third coupler 822 for branching part of a DVB-H signal, which includes a 750 MHz band-GSM phase noise component and is output from the DVB-H receiver 902 of the DVB-H reception unit 900 of the DVB-H signal processing block (refer to FIG. 11F) from the DVB-H signal, a third time delay unit 824 for delaying the DVB-H signal, which is branched by the third coupler 822 and includes the 750 MHz band-GSM phase noise component, a second error amplifier 826 for amplifying the output signal of the third time delay unit 824, and a second subtractor 828 for subtracting the 750 MHz band-GSM phase noise component, which is amplified by the second error amplifier 826 and has a normal phase, from the phase-reversed phase noise, which is amplified by the first error amplifier 815, and for adding the 750 MHz band-phase noise to the phase-reversed phase noise amplified by the first error amplifier 815, thus outputting a phase-reversed and corrected phase noise signal (refer to FIG. 11G).

Here, the DVB-H signal, which includes the 750 MHz band-GSM phase noise component and is branched by the third coupler 822, is shown in FIG. 11F. Such a DVB-H signal is a signal generated by performing filtering on the DVB-H signal, which is received through the DVB-H antenna and includes both the GSM phase noise component and the GSM signal, as shown in FIG. 11E, using a band pass filter in the DVB-H receiver 902.

Further, the reason for requiring the second error amplifier 826 is to equalize power levels because the DVB-H signal, which includes the 750 MHz band-GSM phase noise component and is detected by the third coupler 822, has a power level lower than that of the phase noise signal passed through the power amplifier 815.

Next, the phase noise elimination unit 830 is configured to eliminate phase noise by combining the phase-reversed phase noise, detected by the phase noise detection unit 810, with the GSM signal, including the phase noise. The phase noise elimination unit 830 includes a second time delay unit 832 for delaying the GSM signal passed through the power amplifier 722 (or the second coupler 814), and a combiner 834 for eliminating phase noise from the GSM signal delayed by the second time delay unit 832 by combining the phase-reversed phase noise with the delayed GSM signal, and for outputting the GSM transmission signal of FIG. 11H.

Figure 11H:
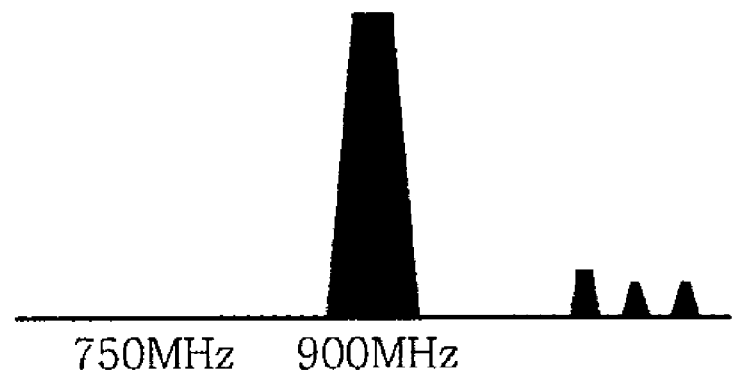

The signal, transmitted from the phase noise elimination unit 830 after the phase noise thereof has been eliminated, is shown in FIG. 11H, and such phase noise may exist in a band above 900 MHz.

Meanwhile, the DVB-H reception unit 900 of the DVB-H signal processing block includes a DVB-H receiver 902 for performing filtering on a signal received through the DVB-H antenna using a band pass filter, thus extracting a DVB-H signal, and a second low-noise amplifier 904 for amplifying and outputting the signal received from the DVB-H receiver 902.

Figure 11I:

In the DVB-H signal processed by the DVB-H reception unit 900 of the DVB-H signal processing block, phase noise is not detected, as shown in FIG. 11I, because the GSM transmission signal of FIG. 11H, from which phase noise is eliminated by the GSM signal processing block, is transmitted.

FIG. 12 is a flowchart showing the operations of a phase noise elimination apparatus according to a further embodiment of the present invention.

Referring to FIG. 12, the input terminal of the GSM transmission unit 720 receives an externally input GSM signal, in which phase noise is not produced, as shown in FIG. 11A, at step S300.

Further, the power amplifier 722 of the GSM transmission unit 720 amplifies the externally input GSM signal to high power and outputs the amplified GSM signal so that the externally input GSM signal can be transmitted through the GSM antenna at step S310.

When the GSM signal passes through the power amplifier 722 in the GSM transmission unit 720, phase noise of FIG. 11B is produced in a GSM transmission signal, and such phase noise must be eliminated.

In order to eliminate such phase noise, the phase noise elimination apparatus 800 detects phase noise at step S330, and combines the detected phase noise with the GSM transmission signal after reversing the phase of the phase noise, thus eliminating the phase noise, at step S340.

For this operation, the first coupler 811 branches part of the externally input GSM signal and outputs the branched GSM signal at step S331. The first time delay unit 812 generates a time delay, corresponding to the time delay of the power amplifier 722, in the GSM signal at step S332.

Further, part of the GSM signal, in which phase noise is produced and which is output from the power amplifier 722, is branched from the GSM signal using the second coupler 814 at step S333, and is subtracted from the externally input GSM signal using the first subtractor 813, and thus the phase-reversed phase noise is detected and output, as shown in FIG. 11C, at step S334.

Thereafter, the phase-reversed phase noise is amplified to a level corresponding to that of the GSM signal passed through the power amplifier 722, using the first error amplifier 815, and the amplified phase noise is then output at step S335.

Meanwhile, the third coupler 822 of the phase noise correction unit 820 branches part of the DVB-H signal, which is generated by performing filtering on the GSM signal received through the DVB-H antenna using a band pass filter in the DVB-H receiver 902, and which has a 750 MHz band-GSM phase noise component, as shown in FIG. 11F, from the received DVB-H signal. The third time delay unit 824 delays the DVB-H signal, which includes the 750 MHz band-GSM phase noise component and is branched by the third coupler 822. The second error amplifier 826 amplifies and outputs the DVB-H signal output from the third time delay unit 824. The second subtractor 828 subtracts the DVB-H signal, which includes the 750 MHz band-phase noise component having a normal phase and which is amplified by the second error amplifier 826, from the phase-reversed phase noise, which is amplified by the first error amplifier 815, thus correcting the phase noise detected by the phase noise detection unit 810 at step S336.

Meanwhile, the second time delay unit 832 of the phase noise elimination unit 830 delays the power-amplified GSM signal output from the power amplifier 722 and outputs the delayed signal so that the time delay generated in the first error amplifier 815 can be cancelled at step S342.

Then, the combiner 834 combines the phase-reversed phase noise with the delayed GSM signal, thus eliminating the phase noise from the GSM signal at step S344.

The GSM signal from which phase noise is eliminated in this way is output to the outside through the GSM transmitter 724 and the GSM antenna. Since the phase noise-eliminated signal is transmitted in this way, the influence of phase noise is nullified even if the DVB-H receiver 902 receives the GSM signal.

Meanwhile, the phase noise correction unit of FIG. 10 can also be applied to FIG. 7. In this case, the coupler of the phase noise correction unit is placed downstream of the DVB-H receiver 602 to branch a signal, the time delay unit of the phase noise correction unit delays the signal branched by the coupler, the error amplifier of the phase noise correction unit amplifies and outputs the delayed signal, and the subtractor of the phase noise correction unit subtracts the signal, output from the error amplifier of the phase noise correction unit, from the phase noise, output from the error amplifier (denoted by reference numeral 514), thus correcting the phase noise.

In this way, when the phase noise correction unit is applied to FIG. 7, corrected phase noise can be obtained, and thus phase noise can be precisely detected and eliminated.

As described above, the present invention provides an apparatus and method for feedforward-type phase noise elimination in a portable terminal, which can block phase noise signals attributable to high-power transmission signals of a portable terminal, such as a GSM terminal, when digital TV broadcasts, such as DVB-H broadcasts, are received, so that the deterioration of reception sensitivity for digital TV broadcasts, occurring due to the phase noise signal of high-power GSM signals, can be prevented, thus improving reception performance for digital TV broadcasts, such as DVB-H broadcasts, and the productivity of portable terminals.

Further, the present invention is advantageous in that, since the phase noise component of a GSM transmission signal applied in a DVB-H reception band is eliminated, the reception performance of a DVB-H receiver can be improved in a GSM communication environment, and digital broadcasts can be reliably received through the DVB-H receiver while GSM communication is being conducted.

In addition, the present invention is advantageous in that the influence of GSM phase noise in a DVB-H reception band can be eliminated, so that an entire DVB-H reception band can be extended to 750 MHz or more, thus realizing frequency scalability.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for feedforward-type phase noise elimination in a portable terminal, comprising:
 a phase noise detection unit configured to detect phase noise using an input signal and an output signal of a power amplifier of a first Radio Frequency (RF) transmission unit for transmitting a first RF transmission signal using an antenna;
 a phase noise elimination unit configured to combine the detected phase noise, detected by the phase noise detection unit, with the first RF transmission signal, output from the power amplifier, thus eliminating phase noise from the first RF transmission signal, passed through the power amplifier, and to output a phase noise-eliminated first RF transmission signal; and
 a phase noise correction unit configured to branch part of a second RF reception signal, which includes phase noise of the first RF transmission signal corresponding to a second RF signal band and is received from a second RF reception unit, from the second RF reception signal, thereby correcting the detected phase noise detected by the phase noise detection unit,
 wherein the phase noise correction unit comprises:
 a coupler configured for branching part of the second RF reception signal, which includes phase noise of the first RF transmission signal and is output from the second RF reception unit, from the second RF reception signal; and
 a subtractor configured for generating a corrected phase noise signal by subtracting the second RF reception signal, output from the coupler, from phase-reversed phase noise detected by the phase noise detection unit, and configured for outputting the corrected phase noise signal to the phase noise elimination unit.

2. The apparatus according to claim 1, wherein the phase noise correction unit further comprises a time delay unit configured for delaying the second RF reception signal, branched by the coupler, and outputting the delayed second RF reception signal to the subtractor.

3. The apparatus according to claim 1, wherein the phase noise correction unit further comprises an error amplifier configured for amplifying the second RF reception signal, output from the coupler, and outputting the amplified second RF reception signal to the subtractor.

4. An apparatus for feedforward-type phase noise elimination in a portable terminal, comprising:
 a phase noise detection unit configured to detect phase noise using an input signal and an output signal of a power amplifier of a first Radio Frequency (RF) transmission unit for transmitting a first RF transmission signal using an antenna; and
 a phase noise elimination unit configured to combine the detected phase noise, detected by the phase noise detection unit, with the first RF transmission signal, output from the power amplifier, thus eliminating phase noise from the first RF transmission signal, passed through the power amplifier, and to output a phase noise-eliminated first RF transmission signal,
 wherein the phase noise detection unit comprises:
 a first coupler configured for branching part of a first RF transmission signal, externally input to the first RF transmission unit, from the first RF transmission signal;
 a second coupler configured for branching part of the first RF transmission signal, passed through the power amplifier, from the first RF transmission signal; and
 a subtractor configured for subtracting a first RF transmission signal, input from the second coupler, from a first RF transmission signal, input from the first coupler, thus detecting and outputting phase-reversed phase noise.

5. The apparatus according to claim 4, wherein the phase noise detection unit further comprises a time delay unit configured for delaying the first RF transmission signal branched by the first coupler, and outputting the delayed first RF transmission signal to the subtractor.

6. The apparatus according to claim 4, wherein the phase noise detection unit further comprises an error amplifier configured for amplifying the phase-reversed phase noise, output from the subtractor, and outputting the amplified phase-reversed phase noise.

7. An apparatus for feedforward-type phase noise elimination in a portable terminal, comprising:
 a phase noise detection unit configured to detect phase noise using an input signal and an output signal of a power amplifier of a first Radio Frequency (RF) transmission unit for transmitting a first RF transmission signal using a first antenna;

a phase noise elimination unit configured to combine the detected phase noise, detected by the phase noise detection unit, with the first RF transmission signal, output from the power amplifier, thus eliminating phase noise from the first RF transmission signal, passed through the power amplifier, and to output a phase noise-eliminated first RF transmission signal, wherein the phase noise detection unit comprises:

a first coupler configured for branching part of a first RF transmission signal, externally input to the first RF transmission unit, from the first RF transmission signal;

a second coupler configured for branching part of a first RF reception signal, which is received through a second antenna and includes phase noise of the first RF transmission signal, from the first RF reception signal; and a subtractor configured for subtracting a first RF reception signal, input from the second coupler, from a first RF transmission signal, input from the first coupler, thus detecting and outputting phase-reversed phase noise.

8. The apparatus according to claim 7, wherein the phase noise detection unit further comprises:

a first time delay unit configured for delaying the first RF transmission signal branched by the first coupler and outputting the delayed first RF transmission signal to the subtractor; and a second time delay unit configured for delaying the first RF reception signal branched by the second coupler and outputting the delayed first RF reception signal to the subtractor.

9. The apparatus according to claim 7, wherein the phase noise detection unit further comprises an error amplifier configured for amplifying the phase-reversed phase noise, output from the subtractor, and outputting amplified phase-reversed phase noise.

10. The apparatus according to claim 1, wherein the phase noise elimination unit comprises a combiner configured for combining the phase noise, detected by the phase noise detection unit, with the first RF transmission signal, passed through the power amplifier, thus eliminating phase noise from the first RF transmission signal.

11. The apparatus according to claim 10, wherein the phase noise elimination unit further comprises a time delay unit configured for delaying the first RF transmission signal, passed through the power amplifier, and outputting the delayed first RF transmission signal to the combiner.

12. A method of feedforward-type phase noise elimination in a portable terminal, comprising:

(a) detecting, by a phase noise detection unit, phase noise using an input signal and an output signal of a power amplifier of a first Radio Frequency (RF) transmission unit for transmitting a first RF transmission signal using an antenna;

(b) combining, by a phase noise elimination unit, the detected phase noise, detected by the phase noise detection unit, with the first RF transmission signal, output from the power amplifier, thus eliminating phase noise from the first RF transmission signal, passed through the power amplifier, and outputting a phase noise-eliminated first RF transmission signal; and (c) branching, by a phase noise correction unit, part of a second RF reception signal, which is output from a second RF reception unit and includes phase noise of the first RF transmission signal corresponding to a second RF signal band, from the second RF reception signal, thus correcting and outputting the detected phase noise detected by the phase noise detection unit, wherein (c) comprises:

branching, by a coupler of the phase noise correction unit, part of the second RF reception signal, which includes phase noise of the first RF transmission signal corresponding to the second RF signal band and is output from the second RF reception unit; and generating, by a subtractor of the phase noise correction unit, a corrected phase noise signal by subtracting the second RF reception signal, output from the coupler, from phase-reversed phase noise detected by the phase noise detection unit, and outputting the corrected phase noise signal to the phase noise elimination unit.

13. The method according to claim 12, wherein (c) further comprises, after the coupler branches part of the second RF reception signal, delaying, by a time delay unit of the phase noise correction unit, the second RF reception signal branched by the coupler and outputting the delayed second RF reception signal to the subtractor.

14. The method according to claim 12, wherein (c) further comprises, after the coupler branches and outputs part of the second RF reception signal, amplifying, by an error amplifier of the phase noise correction unit, the signal output from the coupler and outputting the amplified signal to the subtractor.

15. A method of feedforward-type phase noise elimination in a portable terminal, comprising:

(a) detecting, by a phase noise detection unit, phase noise using an input signal and an output signal of a power amplifier of a first Radio Frequency (RF) transmission unit for transmitting a first RF transmission signal using an antenna; and (b) combining, by a phase noise elimination unit, the detected phase noise, detected by the phase noise detection unit, with the first RF transmission signal, output from the power amplifier, thus eliminating phase noise from the first RF transmission signal, passed through the power amplifier, and outputting a phase noise-eliminated first RF transmission signal, wherein (a) comprises:

branching, by a first coupler of the phase noise detection unit, part of the first RF transmission signal, externally input to the first RF transmission unit, from the first RF transmission signal;

branching, by a second coupler of the phase noise detection unit, part of the second RF transmission signal passed through the power amplifier from the second RF transmission signal; and subtracting, by a subtractor of the phase noise detection unit, the second RF transmission signal, input from the second coupler, from the first RF transmission signal, input from the first coupler, thus detecting and outputting phase-reversed phase noise.

16. The method according to claim 15, wherein (a) further comprises, after the first coupler branches part of the first RF transmission signal delaying, by a time delay unit of the phase noise detection unit, the first RF transmission signal, branched by the first coupler, and outputting the delayed first RF transmission signal to the subtractor.

17. The method according to claim 15, wherein (a) further comprises, after the subtractor detects and outputs the phase-reversed phase noise, amplifying, by an error amplifier of the phase noise detection unit, the phase-reversed phase noise, output from the subtractor, and outputting the amplified phase-reversed phase noise.

18. A method of feedforward-type phase noise elimination in a portable terminal, comprising:

(a) detecting, by a phase noise detection unit, phase noise using an input signal and an output signal of a power amplifier of a first Radio Frequency (RF) transmission unit for transmitting a first RF transmission signal using a first antenna; and (b) combining, by a phase noise elimination unit, the detected phase noise, detected by the phase noise detection unit, with the first RF transmission signal, output from the power amplifier, thus eliminating phase noise from the first RF transmission signal, passed through the power amplifier, and outputting a phase noise-eliminated first RF transmission signal, wherein (a) comprises:

branching, by a first coupler of the phase noise detection unit, part of a first RF transmission signal, externally input to the first RF transmission unit, from the first RF transmission signal;

branching, by a second coupler of the phase noise detection unit, part of a first RF reception signal, which is received through a second antenna and includes phase noise of the first RF transmission signal, from the first RF reception signal; and subtracting, by a subtractor of the phase noise detection unit, a first RF reception signal, input from the second coupler, from a first RF transmission signal, input from the first coupler, thus detecting and outputting phase-reversed phase noise.

19. The method according to claim 18, wherein:

(a) further comprises, after the first coupler branches part of the first RF transmission signal, delaying, by a first time delay unit of the phase noise detection unit, the first RF transmission signal branched by the first coupler, and outputting the delayed first RF transmission signal to the subtractor; and (a) further comprises, after the second coupler branches part of the first RF reception signal, delaying, by a second time delay unit of the phase noise detection unit, the first RF reception signal branched by the second coupler and outputting the delayed first RF reception signal to the subtractor.

20. The method according to claim 8, wherein (a) further comprises, after the subtractor detects and outputs the phase noise, amplifying, by an error amplifier of the phase noise detection unit, the phase-reversed phase noise output from the subtractor, and outputting the amplified phase-reversed phase noise.

21. The method according to claim 12, wherein (b) comprises:

delaying, by a time delay unit of the phase noise elimination unit, the first RF transmission signal, passed through the power amplifier, and outputting the delayed RF transmission signal; and combining, by a combiner of the phase noise elimination unit, the phase noise, detected by the phase noise detection unit, with the first RF transmission signal, passed through the time delay unit, thus eliminating the phase noise from the first RF transmission signal.

* * * * *